United States Patent
Kverel

(10) Patent No.: US 10,155,914 B2
(45) Date of Patent: Dec. 18, 2018

(54) SOLID LUBRICANT

(76) Inventor: Eugene Kverel, New York, NY (US)

(*) Notice: Subject to any disclaimer, the term of this patent is extended or adjusted under 35 U.S.C. 154(b) by 0 days.

(21) Appl. No.: 13/023,337

(22) Filed: Feb. 8, 2011

(65) Prior Publication Data
US 2012/0201487 A1    Aug. 9, 2012

(51) Int. Cl.
| | | |
|---|---|---|
| *C10M 103/02* | (2006.01) | |
| *C10M 103/00* | (2006.01) | |
| *F16C 33/66* | (2006.01) | |

(52) U.S. Cl.
CPC ........ *C10M 103/00* (2013.01); *C10M 103/02* (2013.01); *F16C 33/6696* (2013.01); *C10M 2201/041* (2013.01); *C10M 2201/0413* (2013.01); *C10M 2201/066* (2013.01); *C10M 2213/0606* (2013.01); *C10N 2220/082* (2013.01); *C10N 2230/06* (2013.01); *C10N 2230/08* (2013.01); *C10N 2230/64* (2013.01); *C10N 2240/02* (2013.01); *C10N 2250/08* (2013.01); *F16C 2202/52* (2013.01)

(58) Field of Classification Search
CPC ............. C10M 103/02; C10M 103/04; C10M 103/06; C10M 103/00; C10M 2213/0606; C10M 2201/066; C10M 2201/0413; C10M 2201/041; C10N 2230/64; C10N 2230/08; C10N 2230/06; C10N 2250/08; C10N 2240/02; C10N 2220/082; F16C 33/6696; F16C 2202/52
USPC ........................................ 508/100, 110, 109
See application file for complete search history.

(56) References Cited

U.S. PATENT DOCUMENTS

| | | |
|---|---|---|
| 3,199,934 A | 8/1965 | Van Wyk |
| 3,787,320 A | 1/1974 | Erdmann et al. |
| 3,790,239 A * | 2/1974 | Laux et al. .................. 384/463 |
| 4,560,291 A | 12/1985 | Bonengel et al. |
| 5,190,696 A | 3/1993 | Fujii et al. |
| 5,277,126 A | 1/1994 | Wendt et al. |
| 5,363,821 A | 11/1994 | Rao et al. |
| 5,393,440 A | 2/1995 | Roller et al. |
| 2003/0144155 A1 | 7/2003 | Tenne et al. |
| 2007/0087943 A1* | 4/2007 | Zuckerman .......... C10M 169/04 508/167 |
| 2008/0234149 A1 | 9/2008 | Malshe et al. |
| 2008/0312111 A1* | 12/2008 | Malshe et al. ................ 508/155 |

FOREIGN PATENT DOCUMENTS

| | | | |
|---|---|---|---|
| JP | 11125257 A | * | 5/1999 |
| WO | 20080069936 A1 | | 6/2008 |

OTHER PUBLICATIONS

Fleischer et al., New Nanotechnology Solid Lubricants for Superior Dry Lubrication, Sep. 2003, Proceedings of the 10th European Space Mechanisms and Tribology Symposium, ESA Publications Division, ISBN 92-9092-834-4, pp. 65-66.*

* cited by examiner

*Primary Examiner* — Taiwo Oladapo
(74) *Attorney, Agent, or Firm* — Tutunjian & Bitetto, P.C.

(57) ABSTRACT

A solid lubricant is for a bearing and includes at least thirty percent by weight of graphite, a binding material, and inorganic lubricating nanoparticles. Also, a bearing filled with the solid lubricant is provided.

14 Claims, 1 Drawing Sheet

SOLID LUBRICANT

TECHNICAL FIELD OF THE INVENTION

The present invention relates to bearings, and more particularly to solid lubricants for bearings.

BACKGROUND OF THE INVENTION

Bearings of different kinds, such as rolling bearings and plain bearings need most often to be lubricated in order to function properly and to assure a long service life. It is very common to use oil or grease to lubricate bearings. However, there are situations where oil or grease is not suitable to use for different reasons. For instance, in harsh environments, such as in high temperature environments, oil or grease may not function properly. If the temperature would be too high, there is even a risk that the oil or grease will vaporize. Moreover, there are situations where oil or grease is not suitable to use due to environmental requirements. Such situations could for instance be in the food and beverage industry.

One commonly used solid lubricant is electrographite as a replacement to the sheet metal cage of the bearing. The cage of graphite is during operation releasing graphite to the raceways and rolling element. One drawback of this lubricant is low speed capabilities and reduced bearing service life.

SUMMARY OF THE INVENTION

Thus, an object of the invention is to provide a solid lubricant that solves at least one of the drawbacks of the prior art. More specifically, an object of the invention is to provide a solid lubricant that is heat resistant, provides a low rolling and sliding friction, allows a relatively high bearing speed and provides a long bearing service life.

According to the first aspect of the invention, the object is achieved by a solid lubricant for a bearing, which comprise, at least 30 wt % of graphite, binding material, and wherein the solid lubricant further comprises inorganic lubricating nanoparticles. The composition provides a solid lubricant for a bearing that is heat resistant and which also provides low friction and low wear of the rolling and/or sliding contact surfaces in the bearing, thereby allowing the bearing to run with high speed and/or extend the service life of the bearing. During operation, the solid lubricant comes into contact with metallic surfaces of the bearing and a solid lubricant film will be built by abrasion. If the solid lubricant film is removed, a new film will be built by the reservoir of the compound. The nanoparticles lubricate by a mechanism that can be compared to as the rolling of millions of miniature rolling bearings, thus greatly reducing friction and wear. Other benefits of the invention are: 1) low start-up torque at any temperature, 2) the bearing is lubricated for the life of the bearing, 3) lubricant loss is minimized, 4) suitable for extremely slow speed rotating and oscillating applications and 4) improved worker safety and environmentally friendly compared to many oils or greases.

In an embodiment, the nanoparticles have an average size of 80-160 nanometers.

In an embodiment, the nanoparticles have an average size of 80-90 nanometers.

In an embodiment, the nanoparticles have an average size of 80-100 nanometers.

In an embodiment, the nanoparticles have an average size of 80-110 nanometers.

In an embodiment, the nanoparticles have an average size of 80-120 nanometers.

In an embodiment, the nanoparticles have an average size of 80-130 nanometers.

In an embodiment, the nanoparticles have an average size of 80-140 nanometers.

In an embodiment, the nanoparticles have an average size of 80-150 nanometers.

In an embodiment, the lubricating nanoparticles are inorganic fullerene-like nanoparticles.

In an embodiment, the inorganic lubricating nanoparticles are a metal dichalcogenide. In a further embodiment, the metal dichalcogenide has the chemical formula $MX_z$, wherein M is Molybdenum, Wolfram or any other appropriate metal, and wherein X is Sulfur, Selenium or any other appropriate chalcogen.

In an embodiment, the nanoparticles are nanospheres.

In an embodiment, the nanoparticles are nanotubes.

In an embodiment, the nanoparticles are a combination of nanospheres and nanotubes.

In an embodiment, the inorganic lubricating nanoparticles are inorganic fullerene-like tungsten disulfide nanospheres.

In an embodiment, the solid lubricant comprises at least 0.01 wt % of inorganic lubricating nanoparticles.

In an embodiment, the solid lubricant further comprises at least 1 wt % of molybdenum disulfide.

In an embodiment, the solid lubricant further comprises a high density liquid having a density $\geq 1.8$ g/cm$^3$. The high density liquid facilitates to insert the nanoparticles in the solid graphite lubricant when producing the solid lubricant, also known as a compound or a graphite compound. The nanoparticles may be mixed with the high density liquid and thereafter being united with the solid graphite lubricant.

In an embodiment, the high density liquid is an oil. In an embodiment, the oil is a PFPE (perfluorpolyether) oil. In an embodiment is an anti-rust additive mixed in the high density liquid. In an embodiment, the oil is not a high density oil, e.g. a mineral oil.

In an embodiment, the solid lubricant has a porous structure, wherein the inorganic lubricating nanoparticles are embedded in the porous structure.

In an embodiment of the solid lubricant, the binding material is a thermoset polymer. The thermoset polymer may for instance be Bakelite (phenol-formaldehyde resin), but it may also be any other appropriate thermoset recognized by a skilled person.

In an embodiment of the solid lubricant, it further comprises a reinforcement fiber. The reinforcement fiber may for instance be fiber glass or any other appropriate reinforcement fiber recognized by a skilled person.

In an embodiment, a mix of the components of the solid lubricant is injected into at least a part of a space between an inner ring and an outer ring of a bearing, and thereafter cured until it solidifies. In an embodiment, the mix of the components of the solid lubricant is in a semi-liquid phase when injecting it into the bearing. In an embodiment, after the curing of the lubricant in the bearing, nanoparticles are injected into the solid lubricant.

According to the second aspect of the invention, the objects are achieved by a bearing, which comprises an outer ring and an inner ring, and wherein at least a space between the inner and the outer ring is filled with the solid lubricant according to the first aspect of the invention. It shall be noted that all embodiments of the first aspect of the invention are applicable to all embodiments of the second aspect of the invention and vice versa. The bearing with the solid lubricant provides a lubricated bearing which is heat resistant, provides low friction and low wear in the contacting surfaces between the inner and outer ring, and also prolongs the service life of the bearing compared to prior art bearings.

In an embodiment, the nanoparticles in the solid lubricant have a structure of nested spheres that lubricate by a mechanism that can be considered as the rolling of millions of miniature rolling bearings, thus greatly reducing friction and wear. During operation of the bearing, the solid lubricant maintains a very thin film on the raceways and on the rolling elements of the bearing and thereby avoids metal to metal contact. Other benefits of the invention are: 1) low start-up torque at any temperature, 2) the bearing is lubricated for the life of the bearing, 3) lubricant loss is minimized, 4) suitable for extremely slow speed rotating and oscillating applications and 4) improved worker safety and environmentally friendly compared to many oils or greases. Furthermore, when the bearing is totally filled with the solid lubricant, it may hinder contaminants and other particles from entering into the bearing. Thus, the solid lubricant may function as a seal for the bearing that seals the axial end faces of the bearing.

In an embodiment of the bearing, the outer ring presents an inner raceway on a radially inner peripheral surface of the outer ring, and the inner ring presents an outer raceway on a radially outer peripheral surface of the inner ring. Furthermore, a plurality of rolling elements are positioned between the inner and outer raceway.

In an embodiment, the rolling bearing is a ball bearing or a roller bearing. The ball bearing may be a deep-groove ball bearing, a self-aligning ball bearing, an angular contact ball bearing, a thrust ball bearing or any other ball bearing. The roller bearing may be a spherical roller bearing, a cylindrical roller bearing, a tapered roller bearing, a toroidal roller bearing, a thrust roller bearing (e.g. spherical thrust roller bearing) or any other roller bearing.

In an embodiment, the bearing having a plurality of rolling elements further comprises at least one separating element for separating at least two adjacent rolling elements. The separating element may be a separate spacer between two adjacent rolling elements, i.e. a ball or a roller. Spacers are well known for separating rolling elements in bearings. In an embodiment, spacers are between all the rolling elements in the bearing. In another embodiment, the separating element for separating the rolling elements is a cage or a retainer.

In an embodiment of the rolling bearing presenting at least one separating element, the solid lubricant is at least partly attached to the separating element. If the separating element is a spacer, the solid lubricant may be attached to the spacer. The lubricant may enclose the spacer as a whole, but it may also only cover specific surfaces of the spacer. In an embodiment, the solid lubricant is at least partly attached to the surface of the spacer that is intended to be in contact with the rolling element and/or the inner and outer raceway of the bearing. The spacer may for instance be made of metal, such as iron, copper or brass, but it may also be a polymer spacer or any other appropriate material. If the separating element is a cage, the solid lubricant may enclose all surfaces of the cage, but it may also only cover specific parts of the peripheral surface of the cage.

In an embodiment, the solid lubricant is at least partly attached to the surfaces of the cage that is intended to be in contact with the rolling elements and/or the inner and outer raceway of the bearing. The cage may for instance be made of metal, such as iron, copper or brass, but it may also be a polymer cage or any other appropriate material. In an embodiment, the space between the inner and outer rings is totally filled enclosing the rolling elements and the separating element. A narrow gap will form around the rolling elements and the raceways enabling the bearing components to rotate freely while the solid lubricant may be bonded to the separating element.

In an embodiment of the rolling bearing, the solid lubricant is the separating element. The solid lubricant may be shaped to the form of a spacer or a cage of different designs. In such a case, there is no use of a metal or polymer cage or spacer. The solid lubricant is thus lubricating the bearing and at the same time separating the rolling elements in the bearing. In an embodiment, the space between the inner and outer ring is totally filled and surrounding the rolling elements. A narrow gap will form around the rolling elements and raceways enabling the bearing components to rotate freely. The solid lubricant may be molded into the bearing.

In an embodiment, the bearing is a plain bearing. The solid lubricant may be positioned in a space between the inner and outer bearing ring. In an embodiment, at least one of the inner and outer rings presents a groove in the circumference of the contacting surfaces between the inner and outer ring, and wherein the groove is at least partly filled with the solid lubricant according to the invention. The groove may extend all around the circumference of the two rings.

In an embodiment, the bearing is a sealed bearing, wherein a seal is positioned at least at one of the axial end faces of the bearing, and thereby seals between the inner and the outer ring of the bearing. The seal may be made by a polymer, such as rubber, or any other appropriate material. Furthermore, the seal may be designed in many ways, such as a one- or two-part seal with one or several sealing lips.

The bearing with the solid lubricant is for example good to use in the metal industry (e.g. rolls in bloom or billet casters, cooling and roll out tables, guide roll in bar mills, reheating furnaces rolls), industrial ovens (e.g. kiln truck wheel bearings and chain bearings for hardening and annealing ovens), food and beverage industry (e.g. ovens, smokehouse conveyor lines, wafer machines, sterilization), paint lines for automotive and powder paint, paper industry (e.g. paper converting lines), vacuum and space applications and oil and gas industry (e.g. applications with aggressive solvents). However, there are of course many other suitable areas of use where the bearing may function well.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
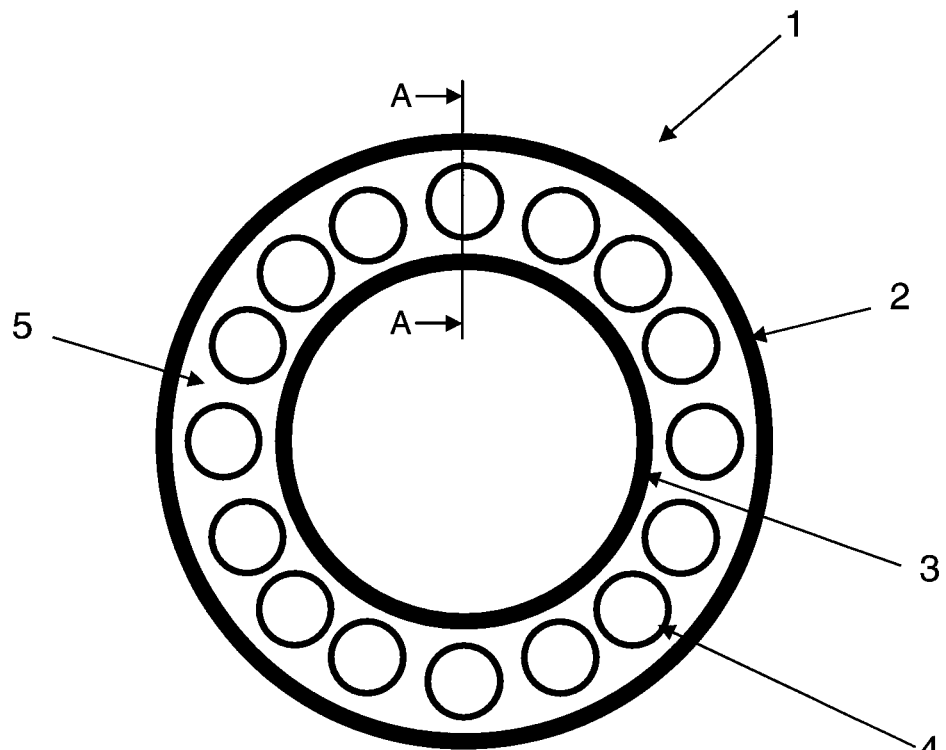
FIG. 1 is a top plan view of a rolling bearing with a solid lubricant according to the invention.

In FIG. 1 is a bearing 1 according to the invention disclosed. The bearing 1 comprises an outer ring 2 and an inner ring 3 positioned coaxially, and rolling elements 4 in-between. Furthermore, in a space 5 is a solid lubricant according to the invention filled. The entire space 5 may be filled with the solid lubricant, but also parts of the space 5 may be filled with the solid lubricant. The solid lubricant may also be bonded to a cage or a spacer (not shown in the figure). The bearing 1 may be a ball bearing or a roller bearing of any kind, such as a deep-groove ball bearing, an angular contact ball bearing, a self-aligning ball bearing etc., or a spherical roller bearing, a tapered roller bearing, a cylindrical roller bearing, a toroidal roller bearing or any other type of roller bearing. It may also be a plain bearing without rolling elements. In such a case, the outer ring 2 and the inner ring 3 will contact each other and be able to relatively rotate by sliding.

Figure 2:
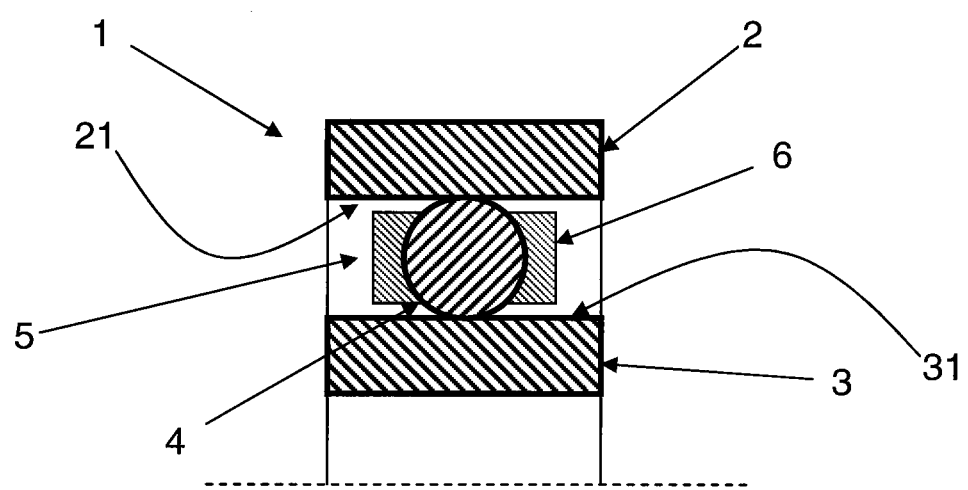
FIG. 2 is a cross section of the rolling bearing along a line A-A in FIG. 1.

In FIG. 2 is a cross section of the bearing 1 along a line A-A in FIG. 1 shown. The bearing 1 comprises an outer ring 2, an inner ring 3, rolling elements 4 (in this illustration the rolling elements are balls), and a cage 6 (which is not shown in FIG. 1). Furthermore, the outer ring 2 presents an inner raceway 21 and the inner ring 3 presents an outer raceway 31. The balls 4 are, at least in the loaded zone, in contact with the inner and outer raceway 21 and 31 so that the inner ring 2 and the outer ring 3 may rotate relative each other. A space 5 is also shown in the figure, which space may be partly or totally filled by the solid lubricant according to the invention. The cage 6 may be partly covered by the solid lubricant, but it may also totally enclose the cage 6. Also, the cage 6 may be totally made of the solid lubricant. The cage 6 may be made of a metal such as iron, copper or brass, but it may also be made of a polymer. There are many different types of shapes and designs possible for the cage 6, depending on the type of bearing, shape of rollers etc. In the case when the space 5 is totally filled with the solid lubricant, the axial end faces of the bearing 1 may be sealed by the lubricant, thus reducing the risk of contaminants and other particles to enter into the bearing 1. The separating element 6 may also be a spacer, which is a separate element that separates at least two adjacent rolling elements. The spacer may be made of a metal such as iron, copper or brass, but it may also be made of a polymeric material. Also, the spacer may be totally made of the solid lubricant according to the invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. A bearing comprising:
   an outer ring;
   an inner ring disposed within the inner ring as to define a space;
   a plurality of roller bearings within the space; and
   a solid lubricant disposed within the space to cover a face of the plurality of roller bearings at axial ends of the bearing and provide a seal for the bearing that seals the axial ends of the bearing, the solid lubricant including at least 30 wt. % of graphite, wherein the solid lubricant further includes a binding material and inorganic lubricating nanoparticles having an average size greater than 150 nanometers, the inorganic lubricating nanoparticles composed of metal chalcogenides including substantially spherical nested fullerene like nanospheres.

2. The bearing according to claim 1, wherein:
   the outer ring presents an inner raceway on a radially inner peripheral surface of the outer ring;
   the inner ring presents an outer raceway on a radially outer peripheral surface of the inner ring; and
   wherein the plurality of roller bearings are positioned between the inner and outer raceway.

3. The bearing according to claim 2, further comprising at least one separating element for separating at least two adjacent roller bearings.

4. The bearing according to claim 3, wherein the solid lubricant is at least partly attached to the separating element.

5. The bearing according to claim 3, wherein the solid lubricant is the separating element.

6. The bearing according to claim 1, wherein the inorganic lubricating nanoparticles comprise a metal dichalcogenide.

7. The bearing according to claim 1, wherein the metal dichalcogenide has a chemical formula $MX_2$, wherein M is selected from the group consisting of molybdenum and wolfram, and X is selected from the group consisting of sulphur and selenium.

8. The bearing according to claim 1, wherein the inorganic lubricating nanoparticles have an average size greater than 130 nanometers.

9. A bearing comprising:
   an outer ring having a first raceway;
   an inner ring having a second raceway;
   a rolling element assembly positioned between the first and second raceway, the rolling element assembly including a plurality of roller bearings that are in direct contact with the first raceway and the second raceway, and a separating element between at least one pair of adjacent rolling elements; and
   a solid lubricant disposed to entirely fill a space between the first raceway, the second raceway and the rolling element assembly to provide a seal that covers a face of the rolling element assembly at axial ends of the bearing to seal the axial ends of the bearing, the solid lubricant including at least 30 wt. % of graphite, wherein the solid lubricant further includes a binding material and inorganic lubricating nanoparticles having an average size nanometers, the inorganic lubricating nanoparticles composed of metal chalcogenides including substantially spherical nested fullerene like nanospheres.

10. The bearing according to claim 9, wherein the solid lubricant is at least partly attached to the separating element.

11. The bear according to claim 9, wherein the separating element is a spacer positioned between said at least one pair of rolling elements, a portion of a cage structure or a combination thereof.

12. The bearing according to claim 1, wherein the inorganic lubricating nanoparticles comprise a metal dichalcogenide.

13. The bearing according to claim 1, wherein the metal dichalcogenide has a chemical formula $MX_2$, wherein M is selected from the group consisting of molybdenum and wolfram, and X is selected from the group consisting of sulphur and selenium.

14. The bearing according to claim 1, wherein the rolling elements comprises a deep-groove ball bearing, a self-aligned ball bearing, an angular contact ball bearing, a thrust ball bearing, spherical roller bearing, cylindrical roller bearing, a tapered roller bearing, a toroidal roller bearing, a thrush roller bearing, or a combination thereof.

* * * * *